(12) United States Patent
Liu

(10) Patent No.: US 8,930,607 B2
(45) Date of Patent: Jan. 6, 2015

(54) UNDERLAYING DEVICE WITH STEADYING COMPONENT FOR LAYING OF A COMPUTER DEVICE

(75) Inventor: Yu Chia Liu, New Taipei (TW)

(73) Assignee: Kaijet Technology International Limited, New Taipei (TW)

( * ) Notice: Subject to any disclaimer, the term of this patent is extended or adjusted under 35 U.S.C. 154(b) by 260 days.

(21) Appl. No.: 13/542,169

(22) Filed: Jul. 5, 2012

(65) Prior Publication Data

US 2013/0013837 A1 Jan. 10, 2013

(30) Foreign Application Priority Data

Jul. 5, 2011 (TW) .............................. 100212278 U

(51) Int. Cl.
*G06F 13/38* (2006.01)
*G06F 13/14* (2006.01)
*G06F 13/40* (2006.01)

(52) U.S. Cl.
CPC ............ *G06F 13/385* (2013.01); *G06F 13/409* (2013.01)
USPC .............................. 710/305; 710/300; 710/62

(58) Field of Classification Search
USPC .......................... 710/300–317, 62–64, 72–74
See application file for complete search history.

(56) References Cited

U.S. PATENT DOCUMENTS

| | | | | |
|---|---|---|---|---|
| 5,687,387 A | * | 11/1997 | Endejan et al. | 710/2 |
| 5,931,949 A | * | 8/1999 | Perlman et al. | 713/300 |
| 6,697,892 B1 | * | 2/2004 | Laity et al. | 710/72 |
| 6,934,788 B2 | * | 8/2005 | Laity et al. | 710/303 |
| 7,574,542 B2 | * | 8/2009 | Burroughs et al. | 710/74 |

* cited by examiner

*Primary Examiner* — Raymond Phan
(74) *Attorney, Agent, or Firm* — Cheng-Ju Chiang

(57) ABSTRACT

An underlaying device includes a main signal port, an expanding signal port, a signal process component, and a power connector. The main signal port is receiving and sending a communication signal from/to the computer device by means of a main signal wire. The expanding signal port is receiving and sending the communication signal from/to an external expanding device. The signal process component is coupled between the main signal port and the expanding signal port for transforming the communication signal into a signal which is able to be received and sent between the main signal port and the expanding signal port. The power connector is supplying power by means of a power wire. The underlaying device is suitable for various computer devices and is able to integrate the functionality of connection ports.

12 Claims, 9 Drawing Sheets

UNDERLAYING DEVICE WITH STEADYING COMPONENT FOR LAYING OF A COMPUTER DEVICE

FIELD OF THE INVENTION

The present invention relates to an underlaying device for a computer device, and more particularly to an underlaying device which is suitable for various computer devices and is able to integrate the functionality of connection ports.

BACKGROUND OF THE INVENTION

In trend of rapidly developing of the computer and semiconductor technology, computer devices such as notebooks and tablet computers are miniaturized. A digital camera, a smart mobile phone, a digital television, and a satellite navigation device, which are all installed with a processor, are also called as computer devices because they are all allocated with their CPUs, the memory, and the I/Os. In spite that the operation speed of these computer devices, which have higher transistor density than before, is faster, it also causes the increase of power consumption and heat generation. It thus leads a higher operation temperature for the computer device and may cause the hardware inside the computer device burned down.

Therefore, it is an important issue to reduce the operation temperature of the computer device in order to prevent it from being shut down.

In the known art, an underlaying device is used for being laid under a computer device so as to improve the air circulation under the computer device in order to release the heat thereof.

SUMMARY OF THE INVENTION

However, the size of the conventional underlaying devices is designed to fit or be little larger than the under shape of computer device. It therefore becomes a necessity that a user must buy various kinds of underlaying devices for fitting various different size of computer devices. Moreover, the conventional underlaying device is provided for heat releasing without any other extra function. Sometimes the conventional underlaying devices affect by blocking the connection between a computer device and other devices, especially when a computer device is miniaturized with much smaller and less amount of connection ports. Furthermore, the connection wires connecting to the computer device looks scattered since the wires are required to detour because being blocked by the underlaying device.

Accordingly, the present invention overcomes the drawbacks of the prior art, and provides an underlaying device which is suitable for various computer devices, without blocking the connection of connection ports, and further able to integrate the connection alignment of connection wires and expand the functionality of connection ports.

The underlaying device comprises a main signal port, an expanding signal port, a signal process component, and a power connector. The main signal port is receiving and sending a communication signal from/to a computer device by means of a main signal wire. The expanding signal port is receiving and sending the communication signal from/to an external expanding device. The signal process component is coupled between the main signal port and the expanding signal port for transforming the communication signal into a signal which is able to be received and sent between the main signal port and the expanding signal port. The power connector is supplying power by means of a power wire. And, the expanding signal port is one or a plurality of ports selected from an USB signal port, a memory card port, a video signal port, a network signal port, and an audio signal port.

In a preferred embodiment of the present invention, it further comprises a steadying component provided on the surface of the underlaying device, wherein the bottom of the steadying component is flat to make the bar-shaped underlaying device steady.

In a preferred embodiment of the present invention, the steadying component is made of a flexible material and protruding from the surface of the underlaying device by encasing the underlaying device.

In a preferred embodiment of the present invention, the steadying component is provided in a sequence from the two ends of the underlaying device toward the center of the underlaying device.

In a preferred embodiment of the present invention, the underlaying device has a lateral surface on its end, and a power switch is provided on the lateral surface.

In a preferred embodiment of the present invention, there is a distance between the bottom of the computer device and a desktop when the computer device is laying on the underlaying device.

In a preferred embodiment of the present invention, a plurality of the expanding signal ports is provided.

In a preferred embodiment of the present invention, the main signal port, the expanding signal port, and the power connector are provided on the surface of the underlaying device with the same height level.

In a preferred embodiment of the present invention, the underlaying device is tube-shaped, and the width of the underlaying device is greater than the height of the underlaying device when the underlaying device is laying on a desktop.

In a preferred embodiment of the present invention, the signal process component has a memory.

By means of technical means of this present invention, the underlaying device can be not only used for various computer devices laying on steadily to improve the air circulation under the computer device so as to help the heat releasing but also with no influence on the arrangement of the connection wire connected to the computer device, because the underlaying device is bar-shaped. Furthermore, the bar-shaped underlaying device is provided with a plurality of steadying components, each one with a flat bottom, so that the underlaying device is more steady and able to prevent the friction between the underlaying device and the computer device. Moreover, the underlaying device has expanding signal ports suitable for various computer devices so as to integrate the connection wires and the expand the functionality of connection ports.

BRIEF DESCRIPTION OF THE DRAWINGS

The structure and the technical means adopted by the present invention to achieve the above and other objects can be best understood by referring to the following detailed description of the preferred embodiments and the accompanying drawings.

DETAILED DESCRIPTION OF THE PREFERRED EMBODIMENTS

The First Embodiment

Figure 1:
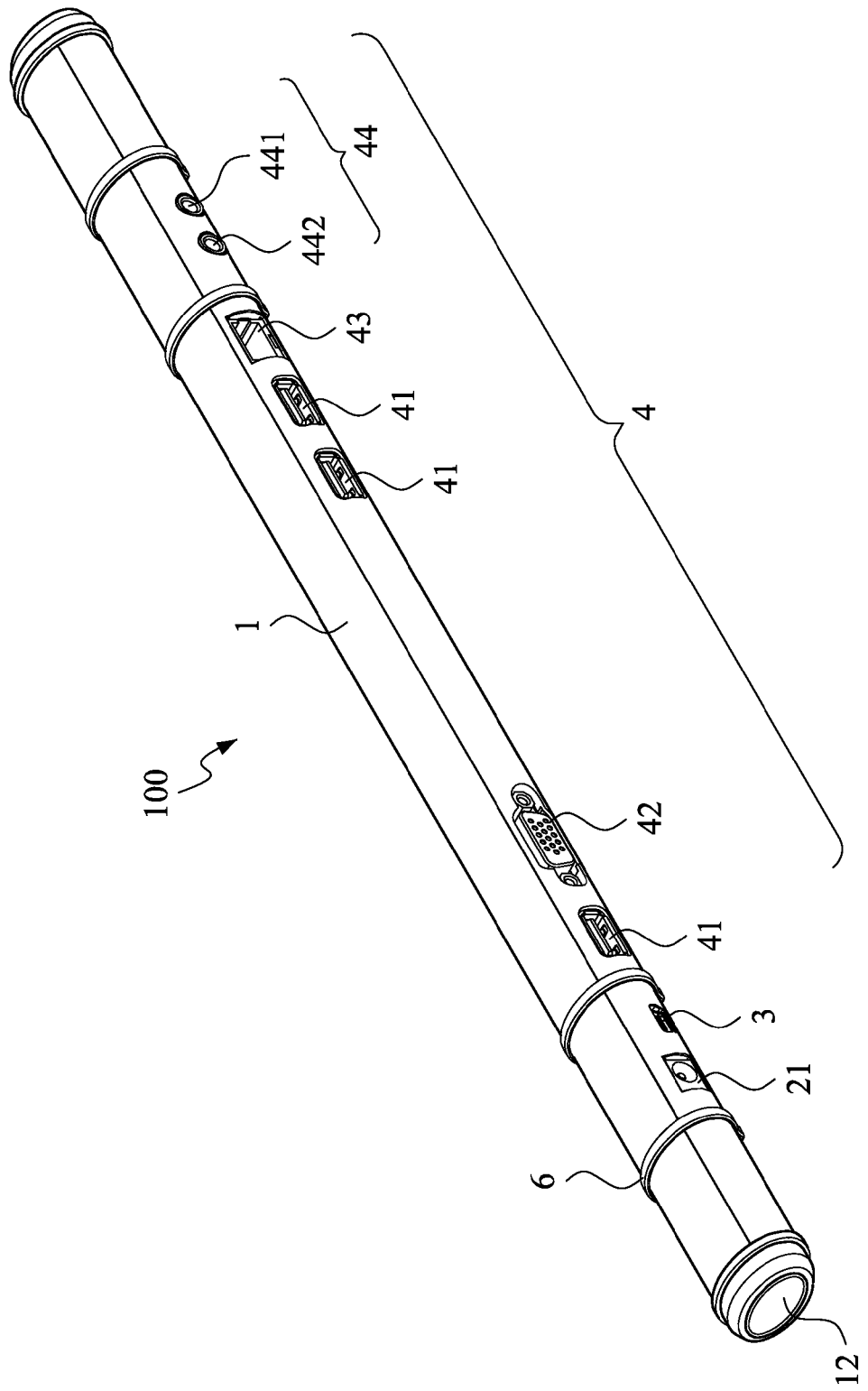
FIG. 1 is a stereogram illustrating the first embodiment according to the present invention.
Figure 2:
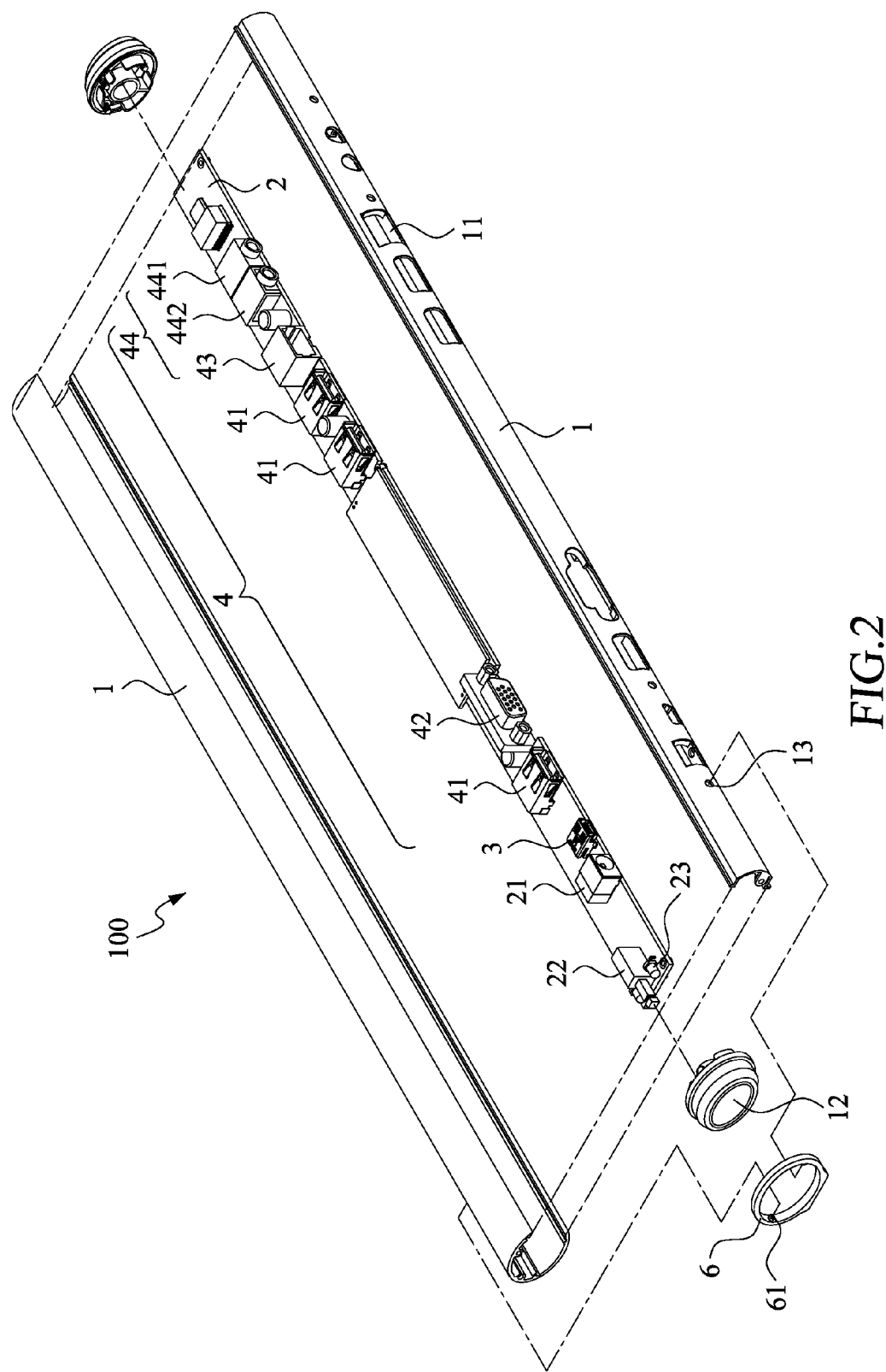
FIG. 2 is an explosion diagram illustrating the first embodiment according to the present invention.

An underlaying device 100 of the present invention is shown in FIG. 1 and FIG. 2. FIG. 1 is a stereogram illustrating the first embodiment according to the present invention. FIG. 2 is an explosion diagram illustrating the first embodiment according to the present invention. In this embodiment, the underlaying device 100 includes a bar-shaped cover 1 and a circuit board 2 provided within the cover 1, and the circuit board 2 is provided with a main signal port 3, a plurality of expanding signal ports 4, a signal process component 5, a power connector 21, a power switch 22, and a power indicator light 23, wherein the plurality of expanding signal ports 4 is selected form an USB signal port, a memory card port, a video signal port, a network signal port, and an audio signal port. In this embodiment, the expanding signal port 4 includes an USB signal port 41, a video signal port 42, a network signal port 43, and an audio signal port 44. The main signal port 3, the expanding signal port 4, and the power connector 21 are arranged with an interval and respectively corresponded to the openings 11 of the cover 1 with the same height level. The bar-shaped cover 1 has a lateral surface on its end, and a button 12 for switching the power switch 22 is provided on the lateral surface. The button 12 is transparent for observing the state of the power indicator light 23. When the power switch 22 is turned on by pressing the button 12, the state of the power indicator light 23 is lighting. And When the power switch 22 is turned off by pressing the button 12 again, the state of the power indicator light 23 is not lighting. The cover 1 can be made of the aluminum, so that the cover 1 is firm and helpful for releasing the heat of the internal components of the underlaying device 100 and the heat of the computer device supported by the underlaying device 100.

In this embodiment, the underlaying device 100 further includes a steadying component 6 provided on the surface of the cover 1. The preferred bottom of the steadying component 6 is flat to make the bar-shaped underlaying device 100 steady. The steadying component 6 can be made of a flexible material, such as a rubber. The steadying component 6 is provided in a sequence from the two ends of the cover 1 toward the center of the cover 1 and protruding from the surface of the cover 1 by encasing the cover 1. In order to prevent the steadying component 6 form separating from the cover 1, the steadying component 6 can further include a fastener 61 correspondingly fastened on a bore 13 of the cover 1 so as to make the steadying component 6 and the cover 1 joint each other closely. In this embodiment, there is a plurality of the steadying components 6 provided on the surface of the cover 1 of the underlaying device 100.

Figure 3:
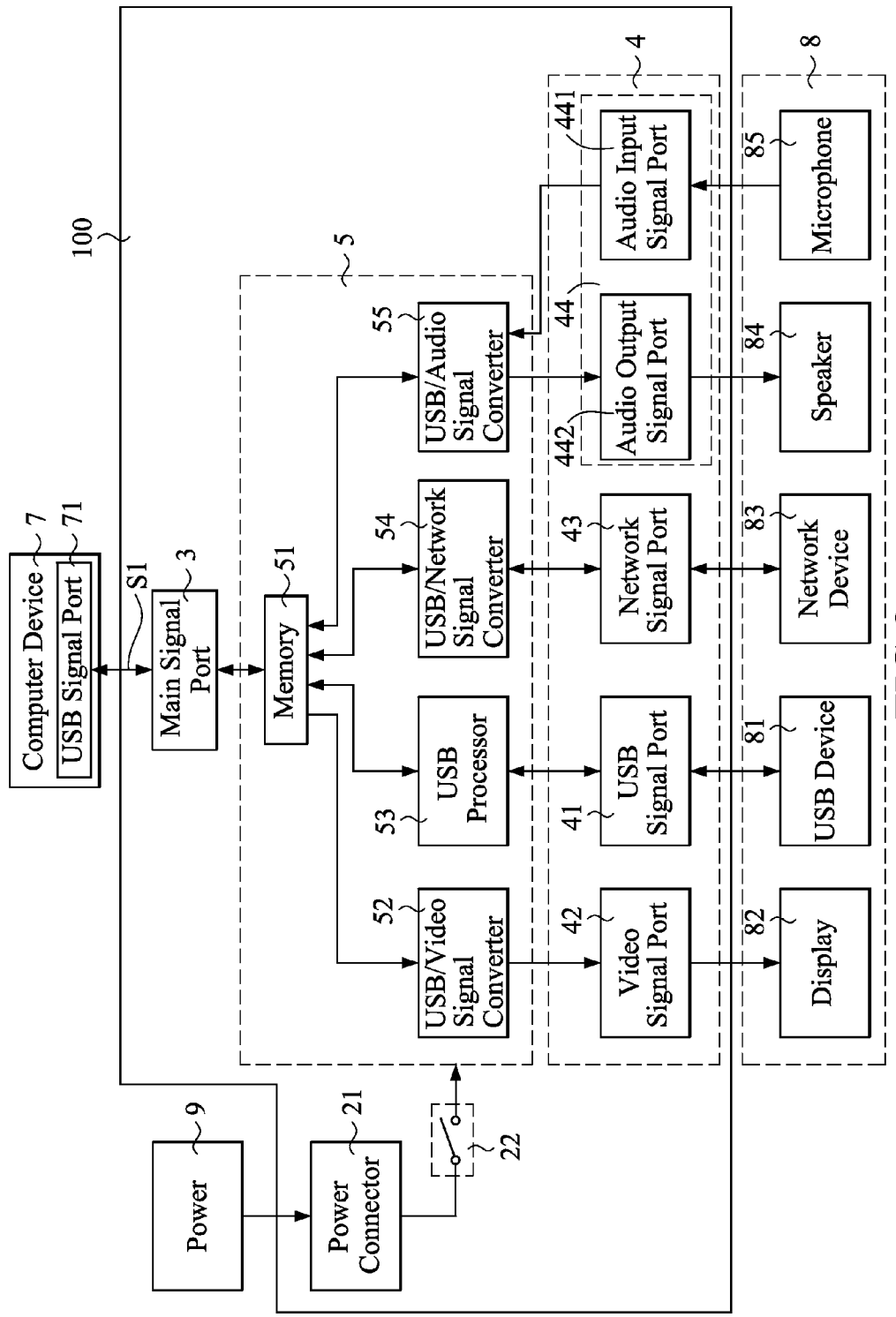
FIG. 3 is a block diagram illustrating the first embodiment according to the present invention.
Figure 4:
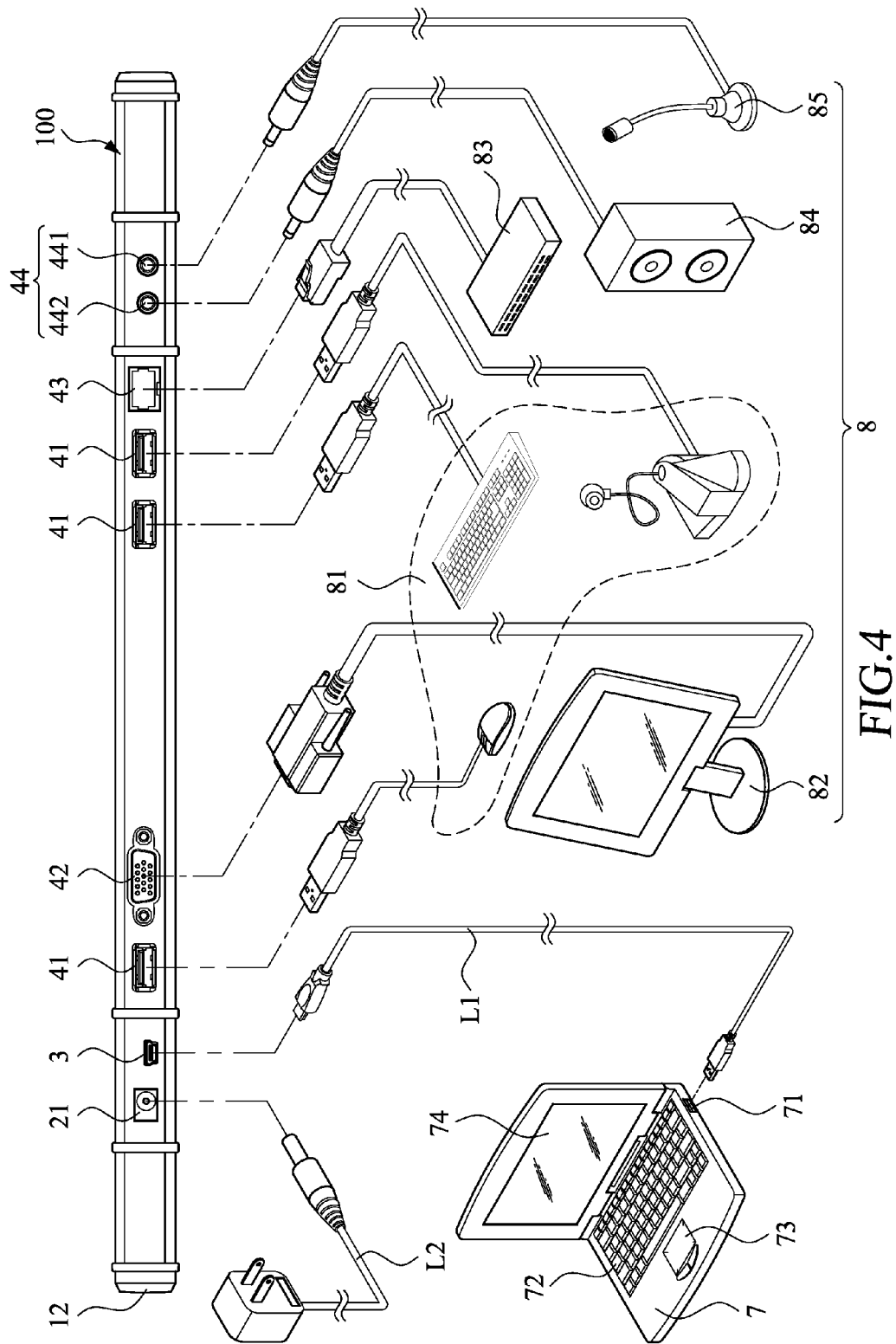
FIG. 4 is an application diagram illustrating the first embodiment according to the present invention.

Refer to FIG. 3 and FIG. 4. FIG. 3 is a block diagram illustrating the first embodiment according to the present invention. FIG. 4 is an application diagram illustrating the first embodiment according to the present invention. The function of the main signal port 3 is receiving and sending a communication signal S1 from/to a computer device 7 by means of a main signal wire L1 connected between an USB signal port 71 of the computer device 7 and the main signal port 3 of the underlaying device 100. The expanding signal port 4 is receiving and sending the communication signal S1 from/to an external expanding device 8. The power connector 21 is supplying power to the underlaying device 100 by means of a power wire L2 connected to an external power 9 to make the underlaying device 100 workable. Further, the on-off state of the input of the external power 9 can be selected by switching the power switch 22.

The external expanding device 8 includes various kinds of the USB devices 81 connected to the USB signal port 41, such as the mouse, the keyboard, the webcam device, the printer, the scanner, and includes a display 82 connected to the video signal port 42, and includes a network device 83 connected to the network signal port 43, and includes a speaker 84 connected to an audio output signal port 442, and includes a microphone 85 connected to an audio input signal port 441.

The signal process component 5 is coupled between the main signal port 3 and the expanding signal port 4 for transforming the communication signal S1 into a signal which is able to be received and sent between the main signal port 3 and the expanding signal port 4. The signal process component 5 can include a memory 51 so as to buffer the communication signal S1. In this embodiment, the signal process component 5 includes an USB/video signal converter 52, an USB processor 53, an USB/network signal converter 54, and an USB/audio signal converter 55. The USB/video signal converter 52 is used to receive and to transform the communication signal S1 from the display 82 to the main signal port 3. The USB processor 53 is used to receive and to transform the communication signal S1 from main signal port 3 to the USB devices 81. The USB/network signal converter 54 is used to receive and to transform the communication signal S1 from the network device 83 to the main signal port 3 and used to send and to transform the communication signal S1 from the main signal port 3 to the network device 83. The USB/audio signal converter 55 is used to transfer and to send the communication signal S1 from the main signal port 3 to the speaker 84 and used to transfer and to receive the communication signal S1 from the microphone 85 to the main signal port 3. The USB/video signal converter 52, the USB processor 53, the USB/network signal converter 54, and the USB/audio signal converter 55 also can be integrated together into a collaborative processor.

The Second Embodiment

Figure 5:
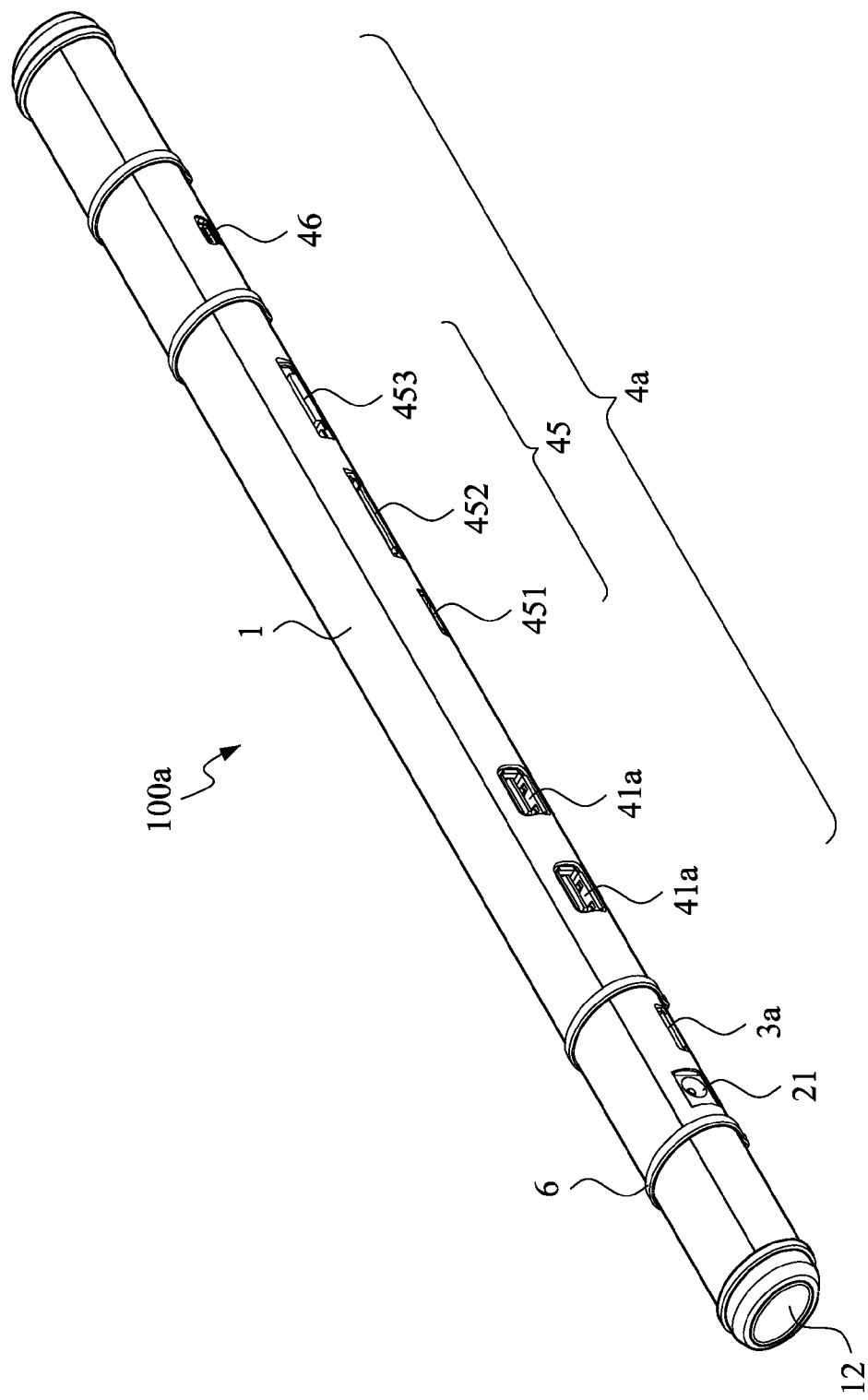
FIG. 5 is a stereogram illustrating the second embodiment according to the present invention.
Figure 6:
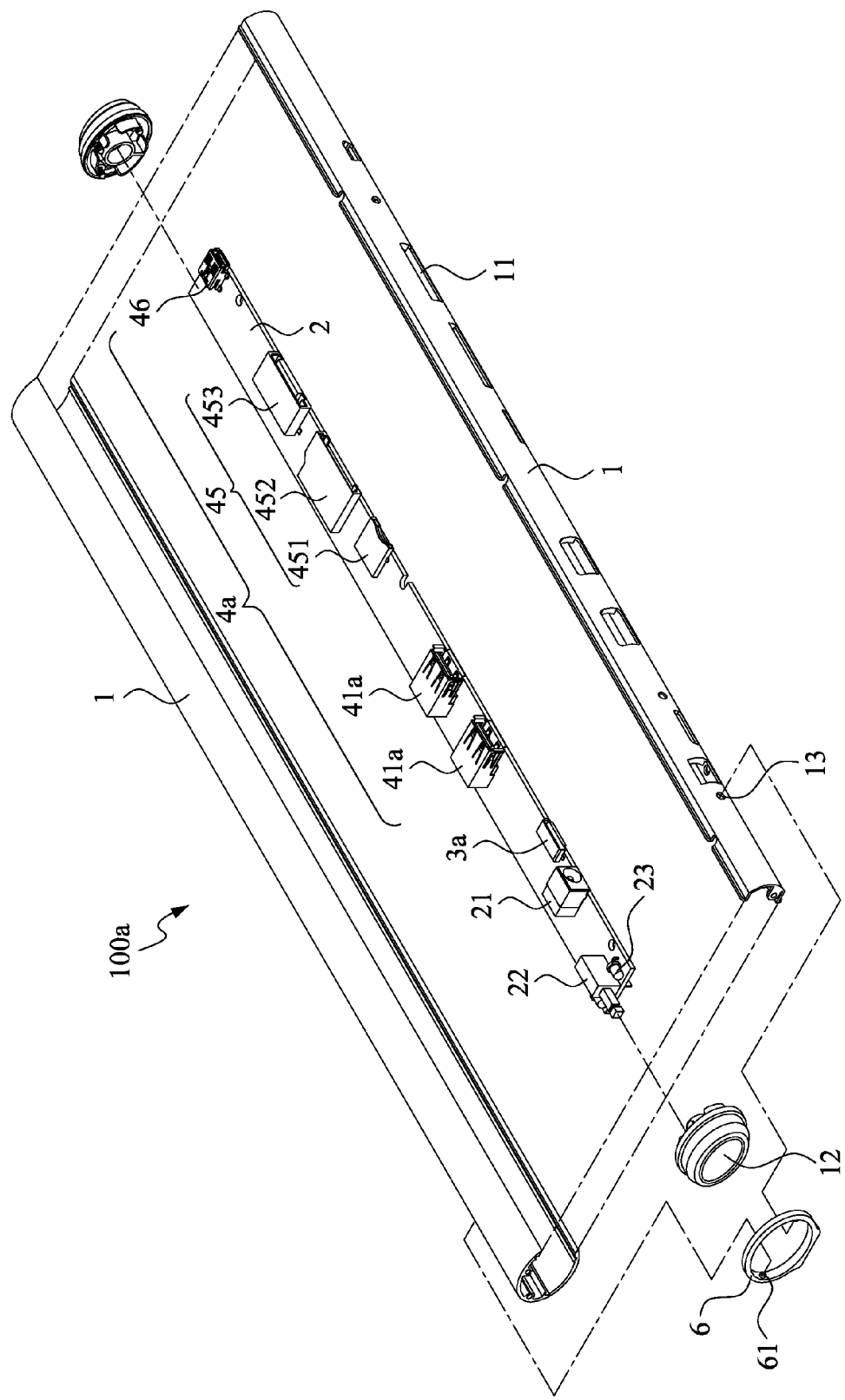
FIG. 6 is an explosion diagram illustrating the second embodiment according to the present invention.

Refer to FIG. 5 and FIG. 6. FIG. 5 is a stereogram illustrating the second embodiment according to the present invention. FIG. 6 is an explosion diagram illustrating the second embodiment according to the present invention. The elements of this embodiment illustrated in these Figs. are similar to those in the first embodiment. So the same element of both embodiments is indicated with same symbol. The second embodiment is different from the first embodiment in as follows. In this embodiment, the expanding signal port 4a includes an USB signal port 41a, a memory card port 45, and a KM (KM Switch: keyboard/mouse switch) port 46. The memory card port 45 includes a MicroSD port 451, a SD/MMC port 452, and a MS port 453.

Figure 7:
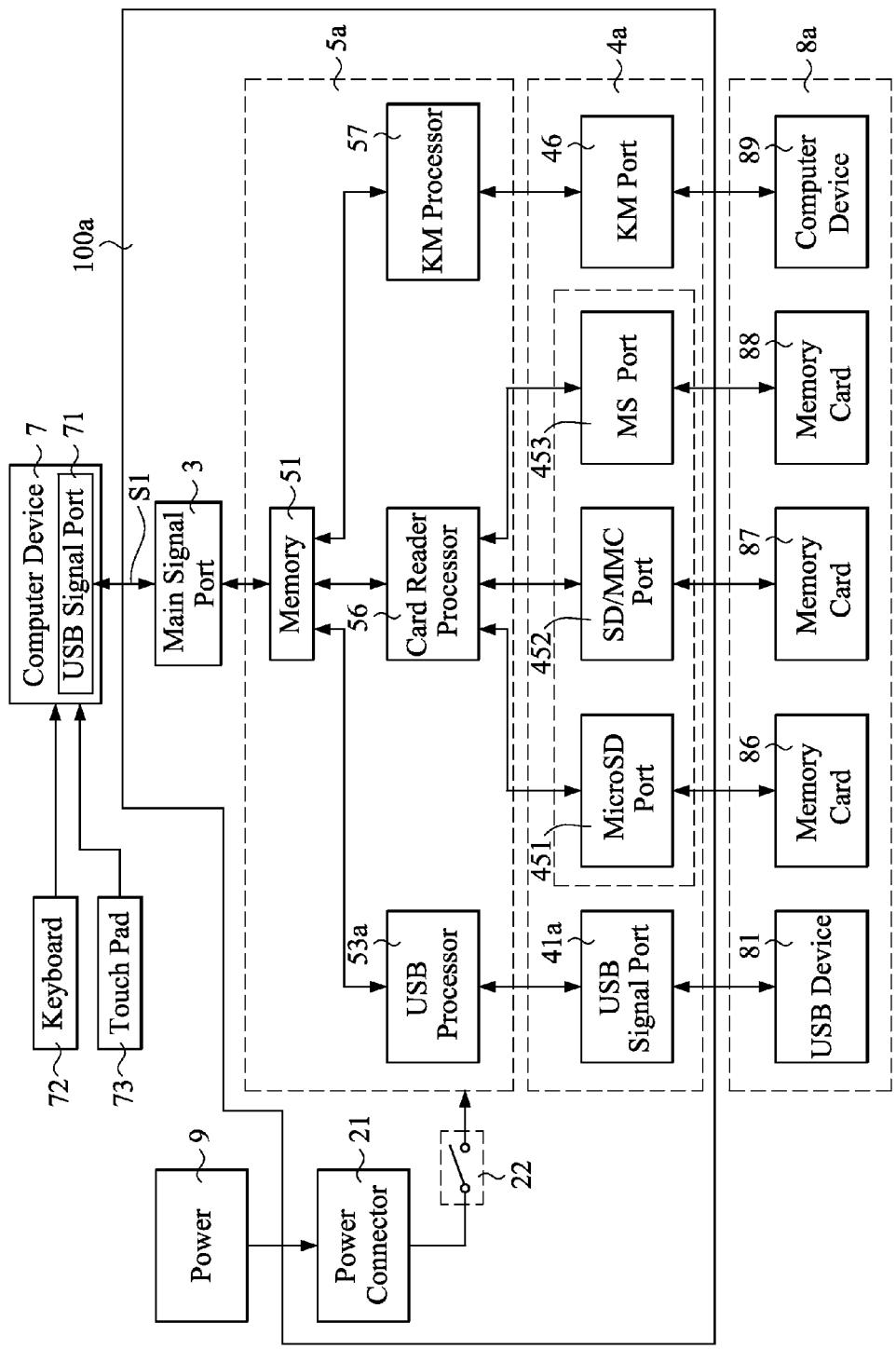
FIG. 7 is a block diagram illustrating the second embodiment according to the present invention.
Figure 8:
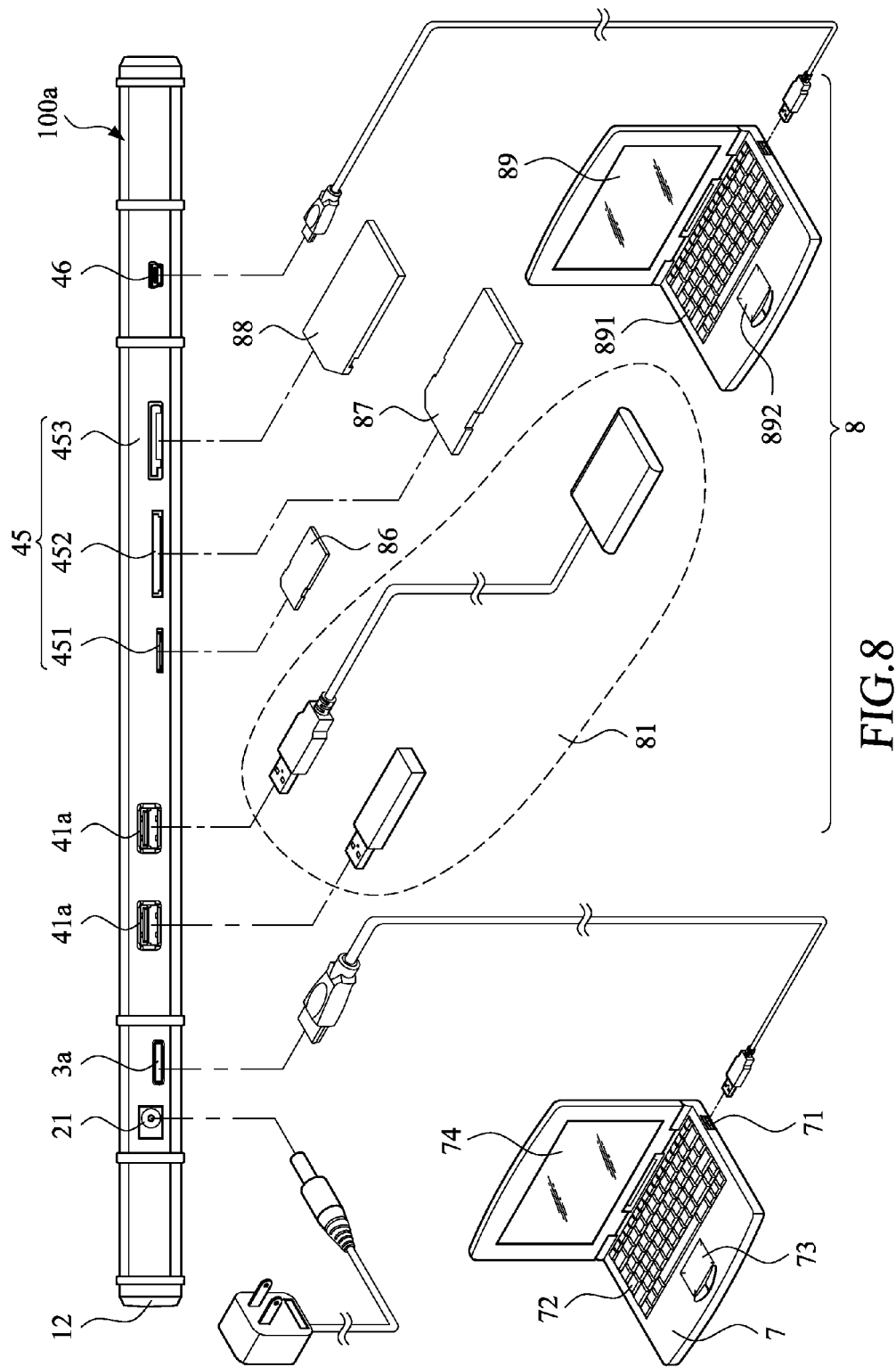
FIG. 8 is an application diagram illustrating the second embodiment according to the present invention.

Refer to FIG. 7 and FIG. 8. FIG. 7 is a block diagram illustrating the second embodiment according to the present invention. FIG. 8 is an application diagram illustrating the second embodiment according to the present invention. In this embodiment, the expanding signal port 4a is receiving and sending the communication signal S1 from/to an external expanding device 8a. The signal process component 5a is coupled between the main signal port 3 and the expanding signal port 4a for transforming the communication signal S1 into a signal which is able to be received and sent between the main signal port 3 and the expanding signal port 4a.

In this embodiment, the external expanding device 8a includes various kinds of the USB devices 81 connected to the USB signal port 41a, such as the flash disk and the hard disk, and includes various kinds of the memory card connected to the memory card port 45, and includes a computer device 89 connected to the KM port 46. A memory card 86 compatible to the MicroSD port 451 of the memory card port 45 can be a MicroSD (T-Flash) card, a MicroSDHC card, and so on. A memory card 87 compatible to the SD/MMC port 452 can be a SD card, a SDHC card, a SDXC card, a MMC card, a RS-MMC card, and so on. A memory card 88 compatible to the MS port 453 can be a MS card, a MS PRO card, a MS Duo card, a MS PRO Duo card, and so on.

The signal process component 5a includes an USB processor 53a, a card reader processor 56, and a KM processor 57. The USB processor 53a is used to receive and to transfer the communication signal 51 from the USB devices 81 to the main signal port 3 and used to transfer and to send the communication signal 51 from the main signal port 3 to the USB devices 81. The card reader processor 56 is used to receive and transfer the communication signal 51 from the memory card 86, 87, 88 to the main signal port 3 and used to transfer and to send the communication signal 51 from the main signal port 3 to the memory card 86, 87, 88. The KM processor 57 is used to receive and to transfer the communication signal 51 from the computer device 89 to the main signal port 3 and used to transfer and to send the communication signal 51 from the main signal port 3 to the computer device 89. The keyboard 72, 891 can be shared between the computer device 7 and the computer device 89 by the KM processor 57. And the touch pad 73, 892 (or the mouse) can be shared between the computer device 7 and the computer device 89 by the KM processor 57 to do the operation including drawing, copying, and pasting to exchange the contents in the notepad and the files between the computer device 7 and the computer device 89 rapidly. Also the file, the picture, the music, and the movie can be transferred between the memory card 86, 87, 88 connected the memory card port 45, the computer device 7, and the computer device 89 by copying and pasting. So it is very suitable for word processing and multimedia editing. The USB processor 53a, the card reader processor 56, and the KM processor 57 also can be integrated together into a collaborative processor.

Figure 9:
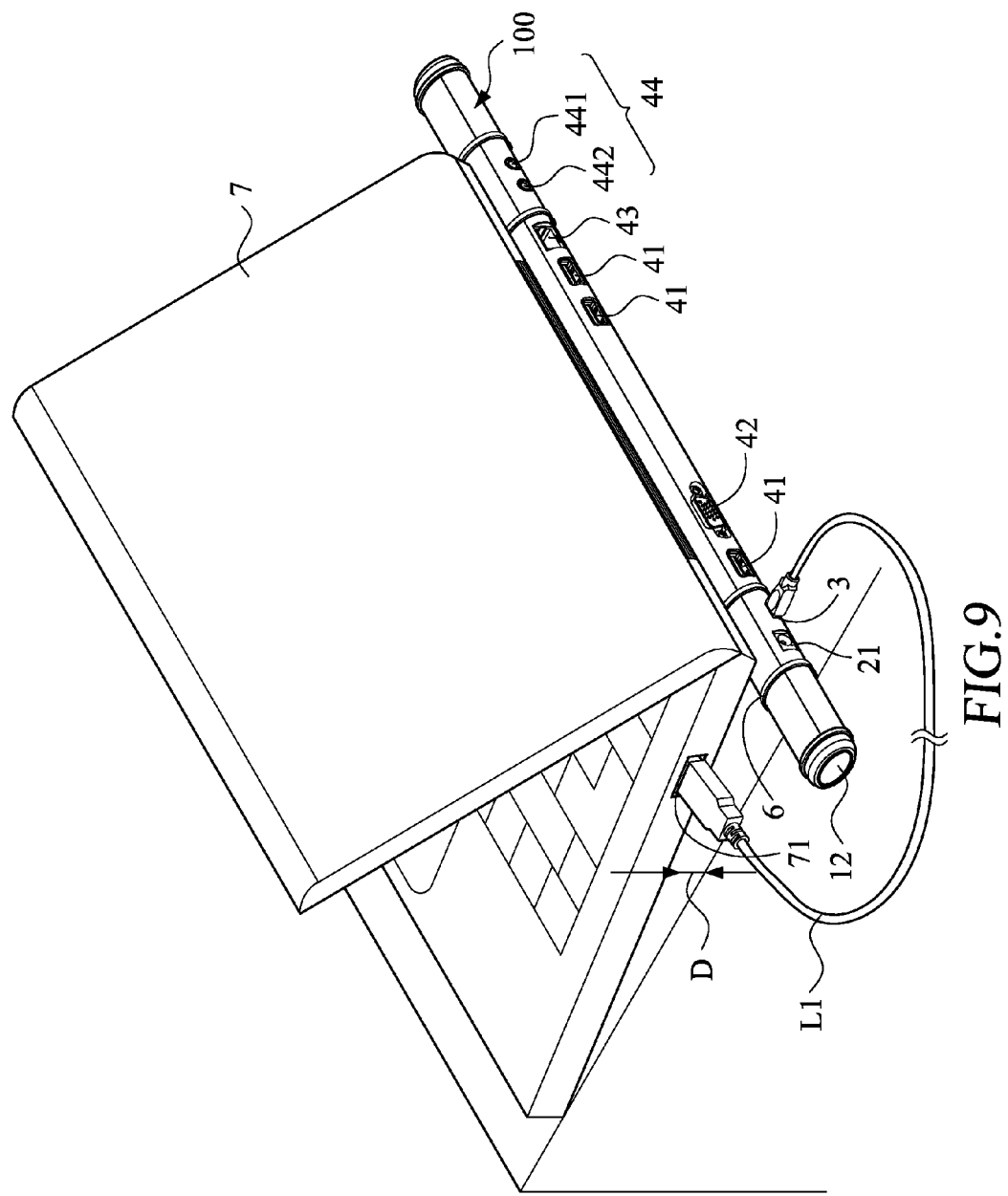
FIG. 9 is an application diagram illustrating a computer device laying on the underlaying device according to the present invention.

Refer to FIG. 9. FIG. 9 is an application diagram illustrating a computer device laying on the underlaying device according to the present invention. As shown in this figure, the width of the underlaying device 100 is greater than the height of the underlaying device 100 when the underlaying device 100 is laying on a desktop, so that the computer device 7 can lay on the underlaying device 100 and tilt to the desktop. There is a distance D between the bottom of the computer device 7 and the desktop when the computer device 7 is laying on the underlaying device 100, so that the contact surface between the computer device 7 and the desktop decreases. It thus improves the air circulation under the bottom of the computer device 7 so as to help the computer device 7 to release the heat and to prevent from being wet. The cover 1 of the underlaying device 100 is tube-shaped and the surface of the cover 1 is arc-shaped. The cover 1 is encased by the steadying component 6 made of the rubber so as to prevent the friction between the underlaying device 100 and the computer device 7. So the computer device 7 can be directly laid on the underlaying device 100 easily. The underlaying device 100 of the present invention not only can be used for the notebook shown in the FIG. 9 but also is suitable for various kinds of the computer device, such as the tablet computer, the digital photographic camera, the digital video camera, the smart mobile phone, the satellite navigation device, because the underlaying device 100 is tube-shaped and has various connection ports and the signal process component 5 compatible with various computer devices. So the underlaying device 100 is suitable and convenient for a lot of users of the computer device. In addition, even if the underlaying device 100 is not used for the computer device laying on but only functions as the expanding connection port, it only takes little space to be placed or to be stored.

As can be appreciated from the above embodiments, the underlaying device of the present invention has industry worth which meets the requirement for a patent. The above description should be considered as only the discussion of the preferred embodiments of the present invention. However, a person skilled in the art may make various modifications to the present invention. Those modifications still fall within the spirit and scope defined by the appended claims.

What is claimed is:

1. An underlaying device, which is bar-shaped and for a computer device laying on, the underlaying device comprising:
    a main signal port receiving and sending a communication signal from/to the computer device by means of a main signal wire;
    an expanding signal port receiving and sending the communication signal from/to an external expanding device;
    a signal process component coupled between the main signal port and the expanding signal port for transforming the communication signal into a signal which is able to be received and sent between the main signal port and the expanding signal port;
    a power connector supplying power by means of a power wire, wherein the expanding signal port is one or a plurality of ports selected from an USB (universal serial bus) signal port, a memory card port, a video signal port, a network signal port, and an audio signal port; and
    at least one steadying component formed independently from the underlaying device, and provided on a surface of the underlaying device to be separable from the underlaying device, wherein a bottom of the at least one steadying component is flat to make the bar-shaped underlaying device steady.

2. The underlaying device as claimed in claim 1, wherein the at least one steadying component is made of a flexible material and protruding from the surface of the underlaying device circularly after installation thereof by encasing resiliently a corresponding location of the surface of the underlaying device.

3. The underlaying device as claimed in claim 1, wherein the at least one steadying component is provided in a sequence from two ends of the underlaying device toward a center of the underlaying device.

4. The underlaying device as claimed in claim 1, wherein the underlaying device has a lateral surface on its end, and a power switch is provided on the lateral surface.

5. The underlaying device as claimed in claim 1, wherein there is a distance between the bottom of the computer device and a desktop when the computer device is laying on the underlaying device.

6. The underlaying device as claimed in claim 1, wherein a plurality of the expanding signal ports is provided.

7. The underlaying device as claimed in claim 1, wherein the main signal port, the expanding signal port, and the power connector are provided on the surface of the underlaying device with the same height level.

8. The underlaying device as claimed in claim 1, wherein the underlaying device is tube-shaped, and the width of the underlaying device is greater than the height of the underlaying device when the underlaying device is laying on a desktop.

9. The underlaying device as claimed in claim 1, wherein the signal process component has a memory.

10. The underlaying device as claimed in claim 1, wherein the at least one steadying component comprises a fastener protruding away from the at least one steadying component toward the surface of the underlaying device so as to fix the at least one steadying component on the surface of the underlaying device.

11. The underlaying device as claimed in claim 1, wherein the at least one steadying component is made of rubber to prevent friction between the computer device and the underlaying device.

12. The underlaying device as claimed in claim 10, wherein a bore is formed on the surface of the underlaying device for receiving the fastener of the at least one steadying component to fix the at least one steadying component on the surface of the underlaying device.

\* \* \* \* \*